United States Patent [19]
Sears

[11] 4,241,372
[45] Dec. 23, 1980

[54] POWER SUPPLY PROTECTIVE CIRCUIT

[75] Inventor: Kay G. Sears, Keyport, N.J.

[73] Assignee: Entron, Inc., Morganville, N.J.

[21] Appl. No.: 16,411

[22] Filed: Mar. 1, 1979

[51] Int. Cl.$^3$ ............................................. H02H 3/093
[52] U.S. Cl. ........................................ 361/72; 361/93; 361/18
[58] Field of Search .................... 361/72, 73, 71, 93, 361/94, 87, 18, 110, 98, 74, 75; 323/1, 9, 22

[56] References Cited

U.S. PATENT DOCUMENTS

| | | | |
|---|---|---|---|
| 3,049,632 | 8/1962 | Staples | 361/72 X |
| 3,182,246 | 5/1965 | Lloyd | 361/18 X |
| 3,229,164 | 1/1966 | McCartney et al. | 361/72 |
| 3,886,932 | 6/1975 | Suessmilch | 361/74 X |
| 4,096,540 | 6/1978 | Sears | 361/93 |

*Primary Examiner*—Patrick R. Salce
*Attorney, Agent, or Firm*—Michael Ebert

[57] ABSTRACT

A protective system interposed between a d-c power supply and an external load to isolate the supply from the load should the current drawn therefrom exceed a predetermined threshold value, the system distinguishing between a transitory overload and a continuous overload condition. The system includes a current-sensing resistor connected in series with the supply and the load and a comparator responsive to the voltage drop developed across the resistor to produce an output signal which activates a relay to cut off the delivery of current to the load only when the current exceeds the threshold value. Also included is a sampling circuit which upon activation of the relay functions after a brief sampling interval to automatically de-activate the relay and thereby reconnect the supply to the load, causing the comparator to again determine whether the existing current drain is still excessive, in which event the relay is again activated and the sampling cycle repeated. A timing-out circuit operates in conjunction with the sampling circuit to permit the sampling cycle to continue repetitively as long as an overcurrent condition is sensed. However, at the conclusion of a timing-out period which is a multiple of the sampling interval, if an overcurrent condition still exists, the timing-out circuit acts to reactivate the relay and cut off the delivery of current to the load and to hold the relay in its activated state.

7 Claims, 1 Drawing Figure

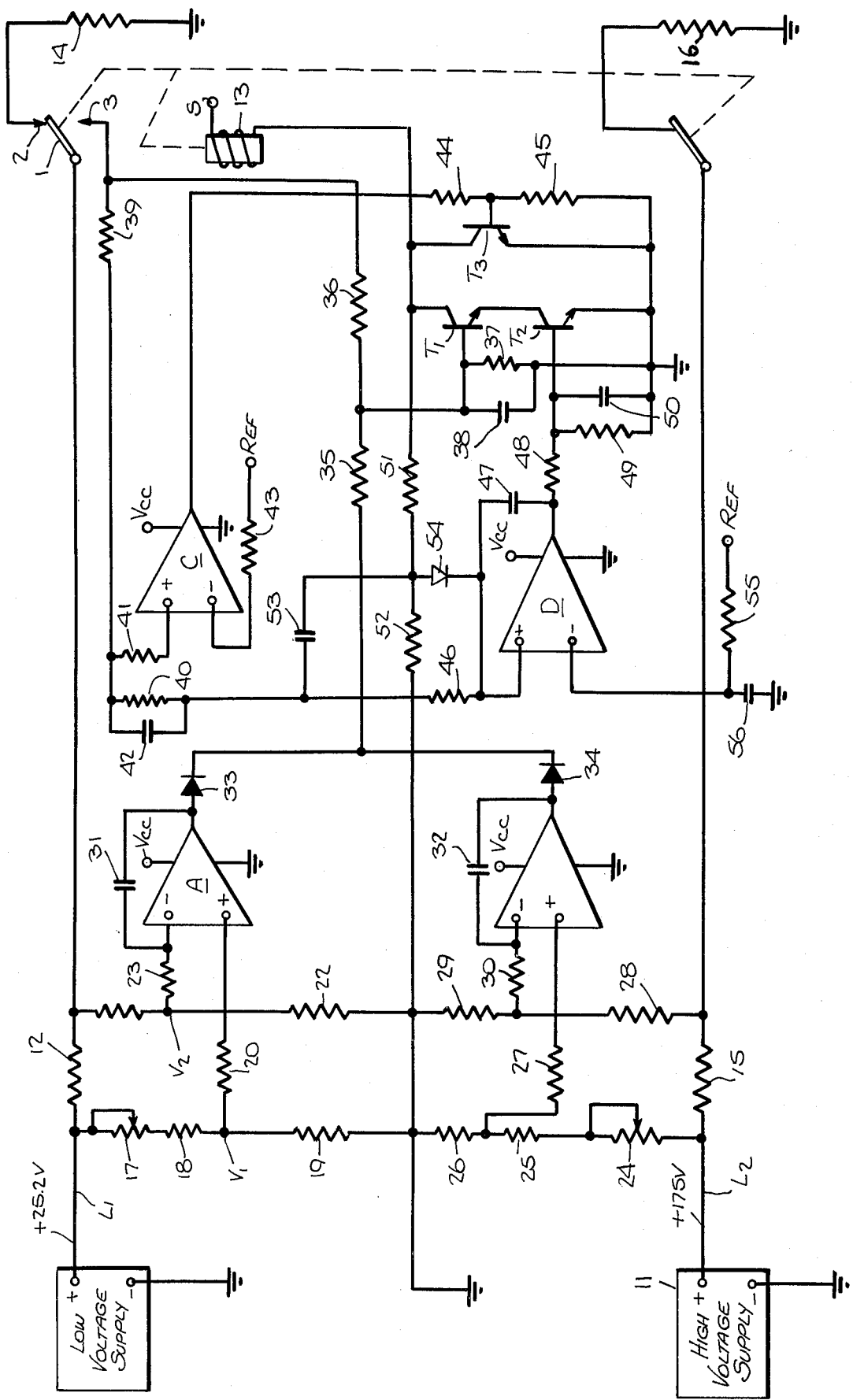

POWER SUPPLY PROTECTIVE CIRCUIT

BACKGROUND OF INVENTION

This invention relates generally to a protective system adapted to isolate a d-c power supply from an external load when the current drawn from the supply is excessive, and more particularly to a system which upon sensing an overload condition then acts during repetitive sampling cycles to intermittently cut off and reconnect the delivery of current to determine whether or not the overload condition is transitory in nature, the system permanently cutting off current delivery should the overload condition exist at the conclusion of the sampling phase interval.

Many forms of military aircraft are provided with guided missile launchers which are mounted on the wing tips or attached to the fuselage. The launcher is permanently secured to its aircraft mounting and is coupled by an umbilical cable to the missile. A connection between the cable and the missile is effected by a releasable coupler such that when the missile is fired and the missile slides off the launcher, the coupler is automatically disengaged to free the missile.

In one known form of launcher, the launcher includes two regulated direct-current power supplies, both of which are operated by an alternating-current generator in the aircraft. One power supply delivers 25 volts with a 3-amp maximum current through the cable to circuits contained in the missile, while the other delivers 175 volts with a 0.2-amp maximum current.

In some instances, because of a defective cable coupler, a decoupling action fails to take place when the missile is fired, as a consequence of which the cable which remains linked to the launcher is ruptured by the departing missile. Such cable rupture may result in a short circuit across one or both of the power supplies. The power supplies in the launcher are potted and shorts thereacross result in overheating of the supplies and the destruction thereof. A short may also occur prior to launching because of a defect in the missile circuits coupled by the cable to the supplies, with the same damaging consequences.

To avoid such damaging effects, there is disclosed in my prior U.S. Pat. No. 4,096,540 a protective system for a regulated d-c current power supply which acts to disconnect the power supply from the load associated therewith in the event of a short circuit or an excessive load having an equivalent effect without, however, in any way impairing the normal operating characteristics of the supply. In this prior art system, a protective relay circuit acts to disconnect the supply from the load when an excessive current is sensed and to automatically reset the connection when the overload condition is cleared up. Where two separate power supplies are involved, the protective circuits are interlocked such that if either relay is actuated, both supplies are disconnected from their missile load circuits.

In my copending application Ser. No. 858,371, filed Dec. 7, 1977, there is disclosed a solid-state protective circuit for isolating a power supply from an external load when an excessive load current condition is sensed. Since semiconductors are used in this protective circuit, the action thereof in response to an overload condition is extremely rapid. Hence a condition lasting for less than one millisecond is sufficient to activate the protector.

With certain types of missiles, a protective system of the type disclosed in my prior patent or in the above-identified copending patent application cannot be used. The inability of these prior systems to protect particular types of missile power supplies is not due to any defect or malfunction thereof but to their inherent lack of ability to cope with factors peculiar to these missiles.

Though one of the two missile power supplies provides a low voltage of +25.2 V and is intended to operate normally with a maximum current drain of 3 amps, when the supply current is first delivered, the start-up drain for a fraction of a second is about 4.5 amperes. Since the prior art protective circuits are designed to cut-off at a given threshold which in this instance would be 3 amperes, the start-up drain of 4.5 amperes would be sensed as an overcurrent condition. Hence the prior protective systems would act to isolate the supply from the load even though the start-up condition does not represent an abnormality but a characteristic of the missile arrangement.

As a consequence, prior protective systems, when used in conjunction with missiles whose start-up drain substantially exceeds the normal maximum current drain, act to prevent the missile from being powered up; for each time primary power is applied to the power supply, the protective system is activated to isolate the d-c power supply from the load. Once activated, primary power must be removed from the power supply in order to reset. If, therefore, a protective system of the prior type were activated in flight, it may not be possible to remove primary power, and the missile would not be able to complete the aircraft mission.

SUMMARY OF INVENTION

In view of the foregoing, the main object of this invention is to provide a protective system for a power supply which acts to disconnect the supply from an external load when an overcurrent condition is sensed, the system distinguishing between a transitory overload, in which event the system reconnects the supply to the load, and a genuine overcurrent fault, in which event the system holds the supply in the disconnect state.

More particularly, an object of this invention is to provide a protective system of the above type in which the distinction between a transitory overcurrent and a genuine overcurrent condition is determined by means including a sampling circuit which, when a relay is activated in response to a sensed overload condition, acts after a predetermined interval to de-activate the relay to cause current to again flow, thereby completing a sampling cycle which is repeated for a predetermined timing-out period.

Yet another object of this invention is to provide a protective system which cooperates with two separate power supplies, each coupled to their loads through respective contacts of a common relay, such that if an overload is sensed in either supply, both supplies are isolated from their loads.

Still another object of the invention is to provide a simple, low-cost protective system for a power supply which operates reliably and with a high degree of efficiency.

Briefly stated, in a protective system in accordance with the invention a current-sensing resistor is serially connected between a power supply and an external load, the voltage drop developed across the resistor being proportional to the intensity of current flow therethrough.

Associated with the sensing resistor is a comparator which produces a low output signal when the voltage drop reflects a current below a predetermined threshold value and a high output signal at threshold and higher values, the high voltage signal acting to activate a relay to cut off the delivery of current to the load. Also included is a sampling circuit which, upon activation of the relay, functions after a brief sampling interval to de-activate the relay and thereby reconnect the supply to the load, at which point the comparator again determines whether the existing current drain is still excessive, in which event a high output signal is produced and the relay again activated to cut off the supply and repeat the sampling cycle.

A timing-out circuit operates in conjunction with the sampling circuit and permits the sampling cycle to repeat as long as an overcurrent condition is sensed. However, at the conclusion of a timing-out period which is a multiple of the sampling interval, if an overcurrent condition still exists, the timing-out circuit acts to reactivate the relay to cut off delivery of current to the load and to thereafter hold the relay in its activated state.

OUTLINE OF DRAWING

For a better understanding of the invention as well as other objects and further features thereof, reference is made to the annexed single FIGURE which is a schematic circuit diagram of a preferred embodiment of a protective system in accordance with the invention.

DESCRIPTION OF INVENTION

The Protective System:

In a protective system in accordance with the invention, two direct-current power supplies 10 and 11 are provided. Supply 10 is a low-voltage supply (i.e. 25.2 V) and supply 11 is a high-voltage supply (i.e., 175 V), the former supply having a 3 amp maximum current and the latter a 0.28 amp maximum current. Any current flow beyond these values represents an overcurrent condition. In an aircraft installation, these D-C power supplies are operated from an A-C generator contained in the aircraft, the generator output being applied to a transformer having low and high voltage secondary windings whose outputs are full-wave rectified. It is to be understood, however, that a protective system in accordance with the invention is not limited to a power supply arrangement of this type.

The positive terminal of low-voltage supply 10 is connected by a line $L_1$ through a current-sensing resistor 12 and normally-closed contacts 1 and 2 of a relay 13 to a load resistor 14. The positive terminal of high-voltage supply 11 is connected by a line $L_2$ through a current-sensing resistor 15 and the normally-closed contacts 4 and 5 of the same relay to a load resistor 16. The negative terminals of both supplies are grounded.

Relay 13 is actuated in response to an overcurrent condition sensed in either power supply line to simultaneously disconnect both supplies from their respective loads. Energization of relay 13 causes movable contact 1 to disengage fixed contact 2 and to engage fixed contact 3, and at the same time to cause movable contact 4 to disengage fixed contact 5, thereby breaking both load circuits.

The protective system includes four operational amplifiers A, B, C and D, each having an inverting input (−) and a direct input (+). Also included are three transistors $T_1$, $T_2$ and $T_3$. Operating voltage $V_{cc}$ is applied to each of the operational amplifiers, a reference voltage REF being applied only to amplifiers C and D. A relay source voltage S is applied to one end of the coil of relay 13. In an actual embodiment, voltage $V_{cc}$ has a value of 13 V, voltage REF a value of 4 V, and voltage S a value of 40 V. These voltages are derived from the D-C power supplies.

Transistors $T_1$ and $T_2$ are connected in series between the other end of the relay coil and ground, while transistor $T_3$ is connected across series-connected transistors $T_1$ and $T_2$. Hence to energize relay 13, both transistors $T_1$ and $T_2$ must be rendered conductive, or transistor $T_3$ alone must be rendered conductive to provide a current path for the relay coil.

Connected between line $L_1$ and ground at the supply end of current-sensing resistor 12 is a voltage divider formed by variable resistor 17 in series with fixed resistors 18 and 19. The junction of resistors 18 and 19 in this divider is connected through an isolating resistor 20 to the direct (+) input of operational amplifier A to apply a voltage $V_1$ thereto. Connected between line $L_1$ and ground at the load end of current-sensing resistor 12 is a voltage-divider formed by resistor 21 in series with resistor 22, the junction of these resistors being connected through isolating resistor 23 to the inverting input (−) of amplifier A to apply a voltage $V_2$ thereto.

Connected between line $L_2$ and ground at the supply end of current-sensing resistor 15 is a voltage divider formed by variable resistor 24 in series with fixed resistors 25 and 26, the junction of resistors 25 and 26 being connected through isolating resistor 27 to the direct (+) input of operational amplifier B to apply a voltage $V_3$ thereto. Connected between line $L_2$ and ground at the load end of current-sensing resistor 15 is a voltage divider formed by fixed resistor 28 in series with fixed resistor 29, the junction of these resistors being connected to the inverting input (−) of amplifier B through isolating resistor 30 to apply a voltage $V_4$ thereto.

The output of amplifier A is connected to the inverting input (−) thereof through a feedback capacitor 31, the output of amplifier B being similarly provided with a feedback capacitor 32. The output of amplifier A is connected through a diode 33 to an output terminal OUT, while the output of amplifier B is connected to the same terminal through a like diode 34.

Terminal OUT is connected through a fixed resistor 35 in series with a fixed resistor 36 to the fixed contact 3 of the relay, the junction of these resistors being connected to the base of transistor $T_1$. This base is connected to ground through an R-C parallel network formed by resistor 37 and capacitor 38.

Contact 3 of the relay is connected through a resistor 39 in series with a resistor 40 to ground, the junction of these resistors being connected through a resistor 41 to the direct input (+) of amplifier C. A capacitor 42 is shunted across resistor 40 to form a charging network. Reference voltage REF is applied to the inverting input (−) of amplifier C through resistor 43.

The output of amplifier C is connected to ground through a voltage divider formed by a resistor 44 in series with a resistor 45, the junction of these resistors being connected to the base of transistor $T_3$. Source voltage S is connected to one end of relay 13, whose other end is connected to the collectors of both transistor $T_1$ and transistor $T_3$, the emitter of transistor $T_3$ being grounded, and the emitter of transistor $T_1$ being connected to the collector of transistor $T_2$ whose emitter is grounded.

The direct input (+) of operational amplifier D is connected to ground through a resistor 46, the direct input being also connected through a feedback capacitor 47 to the output of this amplifier. The output of amplifier D is connected through a resistor 48 to the base of transistor $T_2$, which base is connected to ground through an R-C parallel network formed by resistor 49 and capacitor 50.

The collector of transistor $T_1$ is connected through resistor 51 in series with resistor 52 to ground, resistor 52 being shunted by a capacitor 53. The junction of resistors 51 and 52 is connected through a diode 54 to the positive input (+) of amplifier D. Reference voltage REF is supplied to the inverting input (−) of amplifier D through a resistor 55, this input being connected to ground through a capacitor 56.

Initial Conditions:

For purposes of explanation, certain initial conditions must be assumed for both power supplies as well as for the logic levels of operational amplifier A to D and the bias conditions of transistors $T_1$ to $T_3$.

Accordingly, the following initial conditions are assumed:

A. Low voltage supply 10 is delivering current to load 14 and the existing current demand is below an established threshold value. This current flows through current-sensing resistor 12 and normally-closed contacts 1 and 2 of relay 13 which is initially de-energized.

B. High voltage supply 11 is delivering current to load 16, and the current demand is below an established threshold value. This current flows through current-sensing resistor 15 and normally-closed contacts 4 and 5 of the initially de-energized relay.

C. All four operational amplifiers A to D are receiving their operating voltage $V_{cc}$. Amplifiers C and D are also receiving their reference voltage REF and relay 13 has its operating voltage applied thereto from source S.

D. The logic outputs of operational amplifiers A, B and C are low (about 2 V), whereas that of operational amplifier D is high (about 12 V).

E. Transistor $T_1$, whose base is connected to the terminal OUT common to amplifiers A and B, is in a cut-off state, for the logic outputs of these amplifiers are both low.

F. The base-emitter junction of transistor $T_2$ is forward-biased because the logic output of amplifier D which is connected to the base of this transistor is high. This condition will allow current flow through transistor $T_2$ as soon as transistor $T_1$, which initially is in a cut-off state, is rendered conductive.

G. Transistor $T_3$, whose base voltage is determined by the output of amplifier C, is cut off because the logic output of this amplifier is initially low.

Comparator Operation:

All four operational amplifiers A to D are arranged to function as voltage comparators. When an operational amplifier is connected to behave in this manner, its logic output (high or low) will depend on the relative values of the voltages applied to the direct (+) and inverting (−) inputs thereof.

If the voltage applied to the (+) and (−) inputs of the operational amplifier are at a level which is approximately half the operating voltage $V_{cc}$ but with the direct input (+) somewhat higher than the inverting input (−), the output will then be in the same sense as the direct input; that is, the output will then be high and will be nearly as high as the $V_{cc}$ level. In the embodiment shown, $V_{cc}$ is 13 V, but it is not critical as long as the operational amplifier specifications are not exceeded. If the voltage applied to the inverting input (−) is higher than that applied to the direct input (+), the output of the operational amplifier will then be low or inverted in sense.

Thus the output voltage of the operational amplifier will be low or high, depending on which of the inputs has the higher voltage applied thereto. A relatively high inverting input results in a low output and a relatively high direct input results in a high output. Hence by holding one input at a constant level and allowing the other input to swing high or low with respect to this level, one can cause the output voltage to swing over almost the full $V_{cc}$ voltage range.

This makes it possible to render the comparator sensitive to a small change in the variable input voltage relative to the constant input voltage, so that the transition in output logic takes place when the two inputs are brought to the same level.

Thus in the case of operational amplifier A, voltage $V_1$ applied to the direct input (+) is constant since it is derived from the divider connected at the supply end of current-sensing resistor 12, whereas the voltage $V_2$ applied to the inverting input (−) of this amplifier is variable since it is derived from the divider connected to the load end of the current-sensing resistor 12 and depends, therefore, on the voltage drop across this resistor in accordance with the current demand. The same condition prevails in amplifier B where the voltage $V_3$ applied to the direct input (+) is constant, whereas the voltage $V_4$ applied to the inverting input (−) depends on the voltage drop across the current-sensing resistor 15 in the high voltage supply.

Assuming, therefore, in the case of operational amplifier A or B, that the inverting input voltage is initially higher than the direct input voltage by 100 mV or so, its output will remain low until the inverting input voltage is reduced to a degree causing it to become equal to or lower than the direct input voltage. At this point the output of amplifier A will suddenly go high and stay in this state as long as the direct input voltage level is higher in voltage than the inverting input.

Thus the operational amplifiers have a large gain and the ability to swing over large output voltage ranges. The settings of amplifiers A and B are such that a swing occurs when the current drawn through their respective current-sensing resistors is indicative of an excessive current condition.

Operational amplifier D controls the sampling rate of the system in a manner to be later described. The logic output of this amplifier is normally high but is driven low within 10 to 15 seconds after relay 13 is energized. When the output of amplifier D becomes low, its output, which is applied to the base of transistor $T_2$, renders this transistor non-conductive to interrupt current flow through relay 13, thereby releasing this relay.

Operational amplifier C controls the operation of transistor $T_3$ and acts to hold it biased off until approximately one minute of repeated sampling has been carried out, at which point it renders transistor $T_3$ conductive to energize relay 13 and to hold it energized until power is removed from the power supply. In other words, once transistor $T_3$ is activated, both power supplies are disconnected from their loads and cannot be reconnected until the power supplies are first shut off and are later again switched on.

Calibration and Operation of Amplifiers A and B:

The values of fixed resistors 21 and 22 of the voltage divider connected to the load end of current-sensing resistor 12 in the low voltage line $L_1$ are so chosen that when a nominal voltage of $+25.2$ V is present at the load end, voltage $V_2$ at the junction of resistors 21 and 22 is approximately 6 V. Voltage $V_2$ is applied through isolating resistor 23 to the inverting input $(-)$ of amplifier A.

The values of resistors 18 and 19 in the voltage divider connected to the supply end of current-sensing resistor 12 are chosen so that they are identical to those of resistors 21 and 22 in the other divider, but variable resistor 17 in series with resistors 18 and 19 makes it possible with a normal voltage of 25.2 V at the supply end of current-sensing resistor 12 to adjust the level of voltage $V_1$ at the junction of resistors 18 and 19 to a value lower than $V_2$.

For purposes of calibration, the adjusted value of resistor 17 is initially put at its maximum level, so that regardless of the intensity of current flowing through current-sensing resistor 12 into load 14, the voltage $V_1$ applied to the direct input $(+)$ of amplifier A is at a lower level than voltage $V_2$ applied to the inverting input $(-)$ and the output of amplifier A is low.

Then the value of load resistor 14 is adjusted so that at a selected threshold level (i.e., 3 amps) of current drain from the 25.2 V low voltage supply 10, a predetermined voltage drop occurs across current-sensing resistor 12. In an actual embodiment, sensing resistor 12 has a value of 0.22 ohms, so that with exactly 3 amps delivered to load, the voltage drop thereacross is 0.66 V.

The value of variable resistor 17 is then decreased until a point is reached where the output voltage of amplifier A then begins to swing from low to high. This will occur when voltages $V_1$ and $V_2$ applied to the direct input $(+)$ and inverting input $(-)$ are equal. The operational amplifier A is now calibrated to provide a low output as long as current flowing through current-sensing resistor 12 remains below the selected threshold value of 3 amps. But once the current exceeds the threshold, the operational amplifier will swing to yield a high voltage output signal.

If operational amplifier A were operated without feedback capacitor 31, the transition in output logic from low to high or high to low would occur rapidly, this being determined essentially by the open-loop bandwidth of the amplifier. However, the presence of the feedback capacitor 31 between the output to the inverting input of amplifier A causes transition to take place at a rate determined by the ability of the operational amplifier to discharge the capacitor and the voltage differential between the direct and inverting inputs.

Thus when the current flow through current-sensing resistor 12 is slightly higher than the 3 amp threshold value, this will give rise to only a few millivolt difference between input voltages $V_1$ and $V_2$ and the transition will then be slow. But when the current flow through the sensing resistor is far in excess of the threshold value, the resultant voltage differential will be high and the discharge of the capacitor will take place at a more rapid rate.

The calibration of operational amplifier B, which is responsive to current flow through current-sensing resistor 15 in the high voltage (175 V) supply, is along the same lines as with amplifier A, adjustable resistor 24 being used in this instance to provide the desired voltage $V_3$ for a threshold current of 0.28 amps.

Relay Control:

When current through sensing resistor 12 in the low voltage supply line is below the 3 amp threshold level, the logic output of amplifier A is low. This logic output is applied through forward-biased diode 33 and the voltage divider action of resistors 35 and 37 to the base of transistor $T_1$ and is further reduced thereby. This action serves to hold the base of transistor $T_1$ at a very low level and renders this transistor non-conductive, thereby preventing current flow through the coil of relay 13 and the collector circuit of transistor $T_2$ in series with transistor $T_1$.

When, however, current through sensing resistor 12 exceeds the threshold value, thereby indicating an overload condition, the logic output of amplifier A goes high and the high voltage then applied to the base of transistor $T_1$ renders this transistor conductive. Since transistor $T_2$ is initially in a saturated condition in that its base is connected to the logic high output of amplifier D, when transistor $T_1$ is rendered conductive this causes current to flow through both transistors into relay coil 13, thereby actuating the relay to break the flow of current from both the high and low voltage supplies 10 and 11 to their respective loads.

When the base voltage in transistor $T_1$ rises, capacitor 38 connected between the base and ground is then charged, this charge holding transistor $T_1$ in the conductive state long enough for moving contact 1 of the relay to engage fixed contact 3. When moving contact 1 transfers from contact 2 to contact 3, the 25.2 V supply voltage is removed from load 14 and base current for transistor $T_1$ is then supplied through resistor 36. In this way, transistor $T_1$ is held in its conductive state despite the fact that current through sensing resistor 12 has decreased to nearly zero because its connection to the load has been interrupted and the output logic of operational amplifier A has reverted to a low level. Diode 33 in the output of amplifier A is now back-biased, thereby preventing current flow into the output circuit of this amplifier. Relay 13 will now be held in its actuated state as long as transistors $T_1$ and $T_2$ are conducting.

Should the overcurrent condition arise in the high voltage supply circuit rather than in the low voltage supply, then the action described above in connection with operational amplifier A will occur instead in operational amplifier B whose high output will be applied to common output terminal OUT through diode 34. Relay 13 will be actuated in the manner previously described in connection with the low voltage supply and be held in this state to cut off current both to the low and high voltage loads. Thus when an overcurrent condition is sensed in either the low or high voltage supply circuits, relay 13 will be activated to break the connections between both supplies and their loads.

Sampling:

Initially, transistor $T_1$ is held in a cutoff or non-conductive state because the logic outputs of both operational amplifiers A and B are low. Because no current then flows through the coil of relay 13, the collectors of transistors $T_1$ and $T_3$ which are interconnected assume a positive voltage $(+40$ V$)$ equal to the source voltage S applied to the relay coil.

The voltage then established at the collectors of transistors $T_1$ and $T_3$ appears across a voltage divider formed by series-connected resistors 51 and 52, the voltage across resistor 52 serving to charge capacitor 53 connected thereacross. This charge is fed through forward-biased diode 54 to the direct input (+) of operational amplifier D. The resultant direct input voltage is higher than the reference voltage (4 V) on the inverting input (−) and the logic output of amplifier D is therefore made high. This high output signal is applied to the base of transistor $T_2$ to keep this transistor biased on.

When transistor $T_1$ is rendered conductive to actuate relay 13, the collector voltage on transistors $T_1$ and $T_3$ drops to a relatively low value, and resistor 52 shunted across capacitor 53 then proceeds to discharge this capacitor, thereby rapidly lowering the voltage on the direct input (+) of operational amplifier D. When the voltage on the direct input reaches a value lower than the reference voltage on the inverting input (−) of amplifier D, the logic output of this amplifier goes low, causing transistor $T_2$ to cut off, thereby interrupting current flow through the coil of relay 13 to de-energize the relay and cause current to again flow through the current-sensing resistors 12 and 15.

When relay 13 de-energizes, the voltage on the collectors of transistors $T_1$ and $T_3$ again increases to +40 V, and capacitor 53 re-charges through resistor 51, until a point is reached when the voltage on the direct input (+) of amplifier D via diode 54 again reaches a value higher than the reference voltage on the inverting input (−) and the logic output of this amplifier again goes high. Thus amplifier D acts to intermittently sample the load conditions on the high and low voltage supply lines. The time interval between sampling cycles is determined largely by the feedback capacitor 47 connected between the output and the direct input of operational amplifier D. The length of time transistor $T_2$ remains cut off is determined largely by the charge time constant of capacitor 53 and resistors 51 and 52.

This time constant need only be long enough to ensure cut off to transistor $T_2$ and release of relay 13. Capacitor 50 serves to prevent oscillation in transistor $T_2$ while resistors 48 and 49 function as a voltage divider to assure proper bias for transistor $T_2$.

Timing Out:

Prior to actuation of relay 13 in reseponse to an overcurrent condition and before the low voltage (25.2 V) output of the supply 10 is transferred to contact 3, the logic output of operational amplifier C is low. The reason for this condition is that capacitor 42 is in a discharged state, the discharge having taken place through resistor 40 shunted across the capacitor. Thus the voltage then applied through resistor 41 to the direct input (+) of amplifier C is lower in value than reference voltage (4 V) applied by reference source REF to the inverting input (−) of the amplifier through resistor 43.

When, however, an overcurrent condition is sensed and the 25.2 V potential is applied to relay contact 3, capacitor 42 then proceeds to charge through resistor 39. The maximum charge voltage attainable by capacitor 42 is determined by the source voltage on contact 3 (25.2 V), the ratio of resistors 39 and 40 and the value of the reference voltage (4 V) on the inverting input (−) on amplifier C.

The time constant of this arrangement is such that about one minute is required for the charge on capacitor 42 to equal the voltage on the inverting input, at which point the logic output of amplifier C will go high. When this happens, transistor $T_3$, whose base is connected to the junction of voltage divider series-connected resistors 44 and 45 in the output of amplifier C, will be rendered conductive to provide a current path for relay 13 and thereby energize the relay to break the voltage supply circuits.

If, however, the current in sensing resistor 12 (or in sensing resistor 15) is below the threshold level so that relay 13 remains de-energized and capacitor 42 is not able to continue charging, resistor 40 proceeds to discharge capacitor 42 and continues to do so as long as the relay is de-energized. If relay 13 is re-energized as a result of a sensed current overload capacitor 42 will resume charging until the next sampling cycle.

Should excess current still flow in either sensing resistor when the logic output of operational amplifier C goes high, and sufficient time has elapsed to cause capacitor 42 to attain the critical value necessary to cause this amplifier to go high, transistor $T_3$ will be rendered conductive to energize relay 13 and to hold the relay energized regardless of the conditions of any of the other circuits.

In other words, once transistor $T_3$ is rendered conductive as a result of a critical charge on capacitor 42, there is no way to reduce this charge, for contact 3 is now engaged and applies a constant voltage across this capacitor. Thereafter, relay 13 can only be de-energized by de-activating the power supply for a period sufficient to permit capacitor 42 to discharge through resistor 41.

In operation, when an overcurrent condition is sensed in either power supply line, the protective system is activated to disconnect both lines from their loads and to thereafter re-connect the lines after about 10 to 15 seconds, the sampling interval. If the currents in both lines are then below their respective threshold values, the supply lines will remain connected to their loads; but if either line current is excessive, the circuit will again activate to disconnect the lines and repeat the sampling cycle. Sampling in this manner will continue for the full timing-out period of about one minute; and if an overcurrent condition still exists at the conclusion of the timing out, both supply lines will then be held in the disconnect state until primary power is removed from the supplies.

While there has been shown and described a preferred embodiment of a power supply protective circuit in accordance with the invention, it will be appreciated that many changes and modifications may be made therein without, however, departing from the essential spirit thereof. Thus while an electromagnetic relay is disclosed to interrupt the power supplies, in practice a solid-state switching device may be used for the same purpose.

I claim:

1. A protective system for a D-C power supply delivering current to an external load, the system distinguishing between a transitory overcurrent condition, in which case it functions to momentarily interrupt and then restore current flow, and a genuine overcurrent condition, in which case it functions to interrupt current flow and continuously maintain this interruption, said system comprising:

A. a current-sensing resistor in series with said supply and said load, whereby the voltage drop developed across said resistor is proportional to the intensity of current drawn by the load;

B. a voltage comparator responsive to said voltage drop to produce a low output signal when the drop reflects a current intensity below a predetermined threshold level and a high output signal when the drop reflects a current intensity at least equal to said level;

C. a relay having normally closed contacts interposed between said resistor and said load, said contacts being opened when said relay is activated to interrupt current flow to the load, said relay being responsive to an activated by said high output signal;

D. a sampling circuit rendered operative when said relay is activated and functioning after a brief sampling interval to de-activate the relay and thereby reconnect the supply to the load, at which point the comparator again determines whether the existing current drain is still excessive, in which event a high output signal is produced and the relay again activated to cut off the supply and to repeat the sampling cycle; and E. a timing-out circuit operating in conjunction with the sampling circuit and permitting sampling cycles to repeat as long as an overcurrent condition is sensed for a timing-out period which is a multiple of the sampling interval, the timing circuit at the conclusion of this period acting to reactivate the relay and cut off the delivery of current and to thereafter hold the relay in its activated state.

2. A system as set forth in claim 1, wherein said sampled interval is a few seconds and said timing-out period is about a minute.

3. A system as set forth in claim 1, further including a second d-c power supply operating in conjunction with a second current-sensing resistor in series with the second supply and an external load and a second voltage comparator responsive to the voltage drop across the second resistor, said relay having a second pair of contacts interposed between said second supply and its load, said relay being responsive to a high signal from either comparator whereby when an overcurrent condition is sensed, both power supplies are cut off from their loads by said relay.

4. A system as set forth in claim 1, wherein said comparator is constituted by an operational amplifier having a direct and an inverting input, a first voltage derived from the supply end of said current-sensing resistor being applied to one input and a second voltage derived from the load end of the resistor being applied to the other input.

5. A system as set forth in claim 4, wherein said first voltage is taken from a first voltage divider connected to said supply end and said second voltage is taken from a second voltage divider connected to said load end.

6. A system as set forth in claim 5, wherein said first divider includes an adjustable resistor which is set relative to the impedance of the load to cause said amplifier to produce said high signal when the ratio of said first and second voltage represents a threshold current value.

7. A system as set forth in claim 5, further including a feedback capacitor between the output and the inverting input of the amplifier.

* * * * *